(12) United States Patent
Yamanaka et al.

(10) Patent No.: US 6,263,960 B1
(45) Date of Patent: Jul. 24, 2001

(54) OIL COOLER WITH COOLING WATER SIDE FIN AND OIL SIDE FIN

(75) Inventors: Yasutoshi Yamanaka; Shuji Komoda, both of Kariya; Shinichi Hamada, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/610,549

(22) Filed: Jul. 5, 2000

Related U.S. Application Data

(63) Continuation-in-part of application No. 09/163,682, filed on Sep. 30, 1998, now abandoned.

(30) Foreign Application Priority Data

Nov. 28, 1997 (JP) .................................................... 9-328993
Dec. 2, 1997 (JP) .................................................... 9-331971

(51) Int. Cl.[7] ................................ F28F 19/01; F28F 3/08
(52) U.S. Cl. .......................... 165/119; 165/154; 165/167; 165/916; 123/196 AB; 210/184
(58) Field of Search .................................... 165/119, 166, 165/167, 916, 154; 210/184; 123/41.33, 196 AB

(56) References Cited

U.S. PATENT DOCUMENTS

| | | | |
|---|---|---|---|
| 3,537,513 | 11/1970 | Austin et al. | 165/166 X |
| 3,542,124 | 11/1970 | Manfredo et al. | 165/166 X |
| 4,274,481 | 6/1981 | Ireland et al. | 165/166 X |
| 4,638,856 | 1/1987 | Yamanaka et al. | |
| 4,815,532 | 3/1989 | Sasaki et al. | |
| 4,878,536 | 11/1989 | Stenlund | 165/119 |
| 5,014,775 | 5/1991 | Watanabe | 165/167 |
| 5,121,790 | 6/1992 | Persson | 165/167 X |
| 5,718,281 | 2/1998 | Bartalone et al. | 165/119 X |

FOREIGN PATENT DOCUMENTS

| | | |
|---|---|---|
| 0 604 193 | 6/1994 | (EP) . |
| 0 631 804 | 1/1995 | (EP) . |
| 2270971 | 3/1994 | (GB) . |
| 6-185332 | 7/1994 | (JP) ............... 165/916 |
| 9-273883 | 10/1997 | (JP) . |

*Primary Examiner*—Leonard Leo
(74) *Attorney, Agent, or Firm*—Harness, Dickey & Pierce, PLC

(57) ABSTRACT

An oil cooler has a tube disposed in a cooling water passage and defining an oil passage therein, an oil side inner fin brazed to an inside wall of the tube in the oil passage, and a water side inner fin brazed to an outside wall of the tube in the cooling water passage. The thickness Tw of the water side inner fin is thicker than the thickness To of the oil side inner fin. The water side and oil side inner fins are corrugated fins.

20 Claims, 16 Drawing Sheets

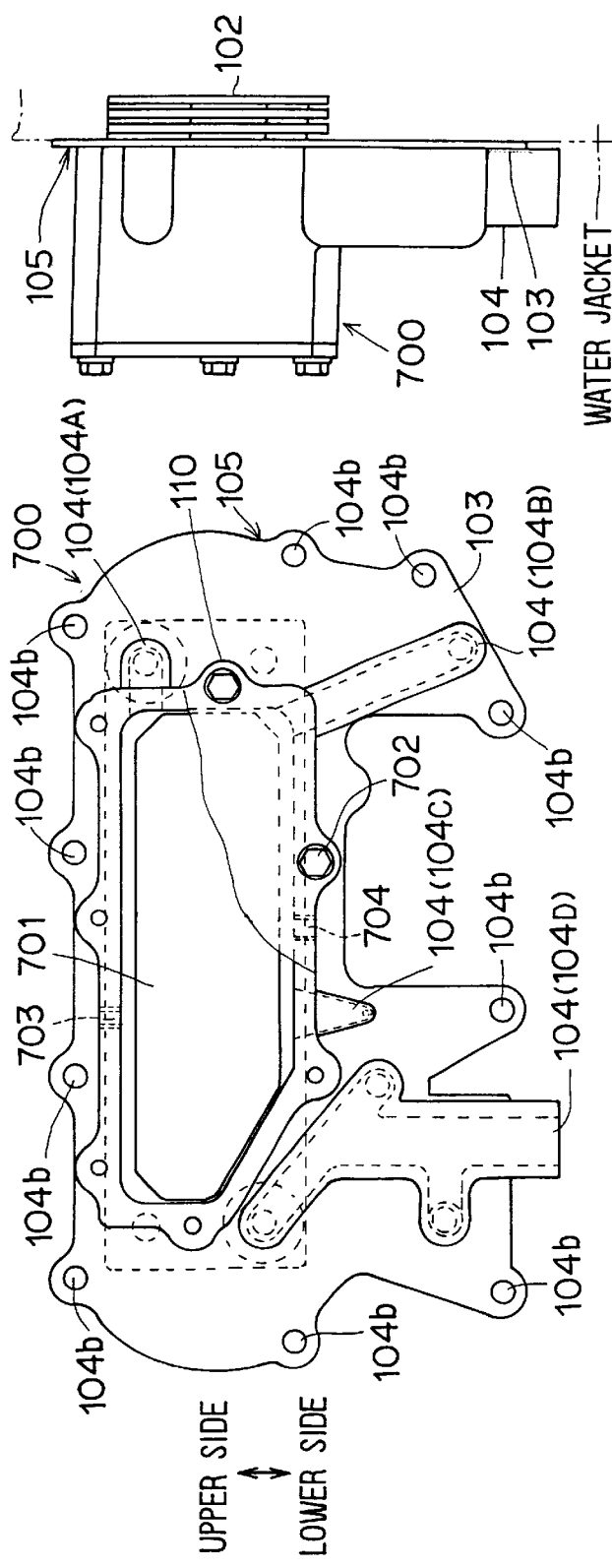
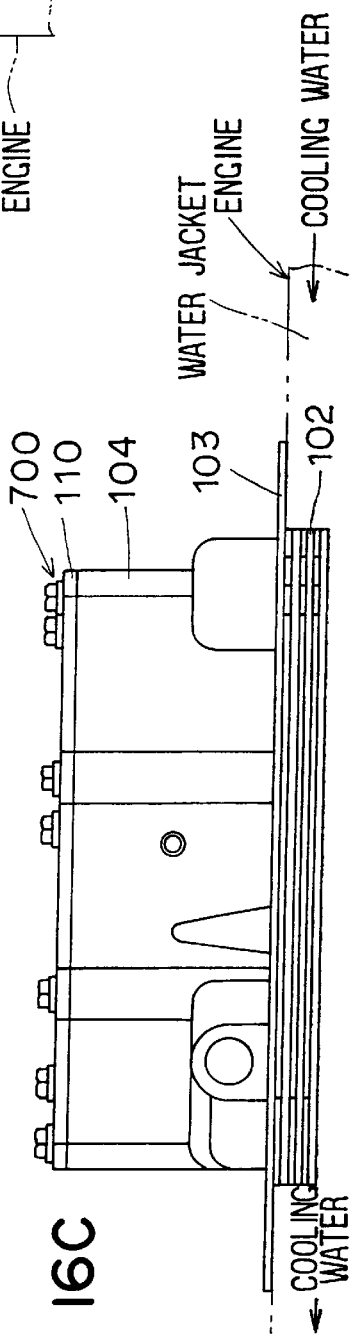
FIG. 16A  FIG. 16B  FIG. 16C

OIL COOLER WITH COOLING WATER SIDE FIN AND OIL SIDE FIN

CROSS REFERENCE TO RELATED APPLICATION

This is a continuation-in-part application of a patent application Ser. No. 09/163,682 filed on Sep. 30, 1998, abandoned.

BACKGROUND OF THE INVENTION

1. Field of the Invention

This invention relates to an oil cooler for cooling engine oil circulating in a water-cooled engine, by exchanging heat between cooling water for the water-cooled engine and the engine oil.

2. Description of the Related Art

Recently, a number of apparatuses such as an oil cooler which are installed in an engine room has increased. In such a tendency, clearances among the apparatuses in the engine room have been reduced to comply with the increase in number of the apparatuses and not to increase the size of the engine room. When the clearances among the apparatuses are reduced, however, installation performance (mountability) of the apparatuses deteriorates. This may cause increase in manufacturing cost of the vehicle. Because of this, the size reduction of each apparatus has been required.

SUMMARY OF THE INVENTION

The present invention has been made based on the above problem. An object of the present invention is to provide an automotive oil cooler with a small size.

According to the present invention, an oil cooler has a tube disposed in a cooling water passage and defining an oil passage therein, an oil side fin fixed to an inside wall of the tube, and a water side fin fixed to an outside wall of the tube and having a plate thickness thicker than that of the oil side fin. A pressure of the oil flowing in the oil passage is higher than that of the cooling water flowing in the cooling water passage. Preferably, the oil side and water side fins are corrugated fins.

Accordingly, the oil side and water side fins can be formed to have small fin pitches, respectively, so that the size of the oil cooler is reduced. Further, each of the fins can have a high density and a large withstand pressure strength. Because the plate thickness of the water side fin is thicker than that of the oil side fin, a climbing rate of temperature of the water side fin is prevented from exceeding that of the oil side fin when they are brazed. As a result, brazing deficiencies caused by erosion of the water side fin can be prevented. Further, because the plate thickness of the water side fin is thicker than that of the oil side fin in a state where the pressure of the oil is higher than that of the cooling water, the water side fin can prevent the cooling water passage from being crushed by the pressure imparted from the oil even when brazing defficiencies occur. Preferably, the oil cooler further has a casing, a partition member integrally brazed to the casing and partitioning inside of the casing into the cooing water passage and a filter casing portion, and a filter disposed in the filter casing portion. Accordingly, there is no need to use O-rings for securing sealing property between the cooling water passage and the filter casing portion, resulting in decrease in number of parts for the oil cooler. This further results in manufacturing cost reduction of the oil cooler.

BRIEF DESCRIPTION OF THE DRAWINGS

Other objects and features of the present invention will become more readily apparent from a better understanding of the preferred embodiments described below with reference to the following drawings;

FIG. 16A is a front view showing an oil cooler in a seventh embodiment;

FIG. 16B is a right side view showing the oil cooler of FIG. 16A;

FIG. 16C is a bottom view showing the oil cooler of FIG. 16A;

DETAILED DESCRIPTION OF THE PREFERRED EMBODIMENTS (First Embodiment)

Figure 1:
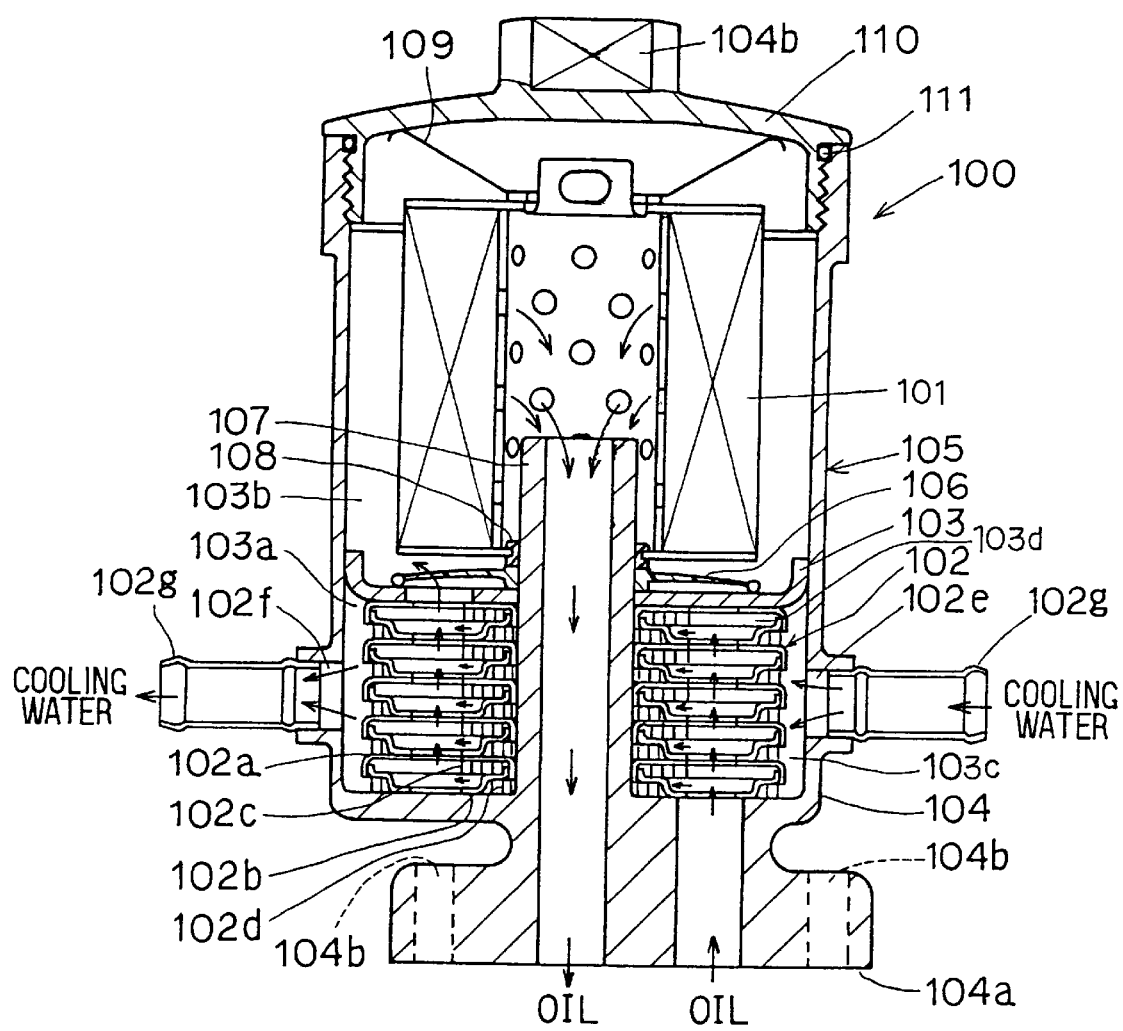
FIG. 1 is a cross-sectional view showing an oil cooler in a first embodiment.

An oil cooler 100 shown in FIG. 1 of a first preferred embodiment is to be fixed to a wall of a water-cooled engine (herebelow referred to as an engine). The oil cooler 100 has a cylindrical filter element 101 (herebelow referred to as a filter) for filtering engine oil (herebelow referred to as oil) circulating in the engine so that foreign materials are removed from the oil. The oil cooler 100 further has an oil cooler core portion 102 (herebelow referred to as a core portion) for exchanging heat between engine cooling water (herebelow referred to as cooling water) and the oil.

Figure 2:
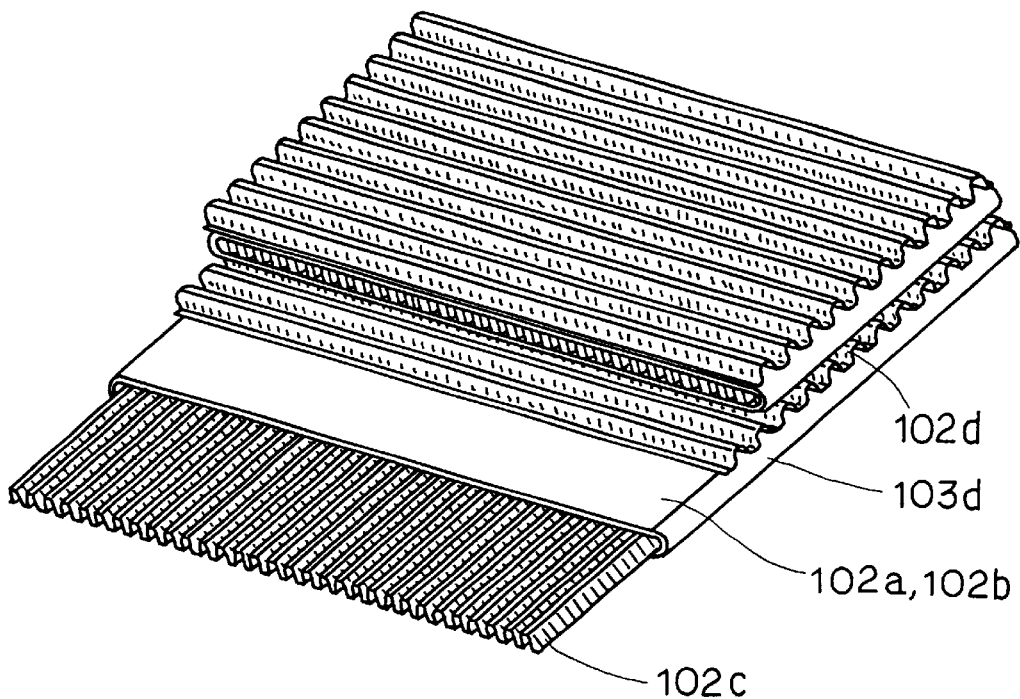
FIG. 2 is a perspective view showing a core portion of the oil cooler in the first embodiment.

The core portion 102 is composed of a plurality of core units which are laminated with and brazed to one another in a thickness direction thereof (see FIG. 2). Each of the core units has core plates 102*a*, 102*b* which are pressed to have specific shapes and a rectangular corrugated oil side inner fin 102*c* which is brazed to the core plates 102*a*, 102*b* therebetween. A cooling water passage 103*c* for flowing the cooling water therein and an oil passage (tube) 103*d* for flowing the oil therein are separated from one another by the core plates 102*a*, 102*b*. That is, the oil passage 103*d* defined by the core plates 102*a*, 102*b* is provided in the cooling water passage 103*c*. Each of the core units is laminated with adjacent one of the core units through a rectangular corrugated cooling water side inner fin 102*d*. The cooling water side inner fin 102*d* is brazed to the corresponding core plates 102*a*, 102*b* between the two adjacent core units. The thickness (fin thickness, plate thickness) Tw of the cooling water side inner fin 102*d* is thicker than the thickness (fin thickness, plate thickness) To of the oil side inner fin 102*c*.

Figure 3:
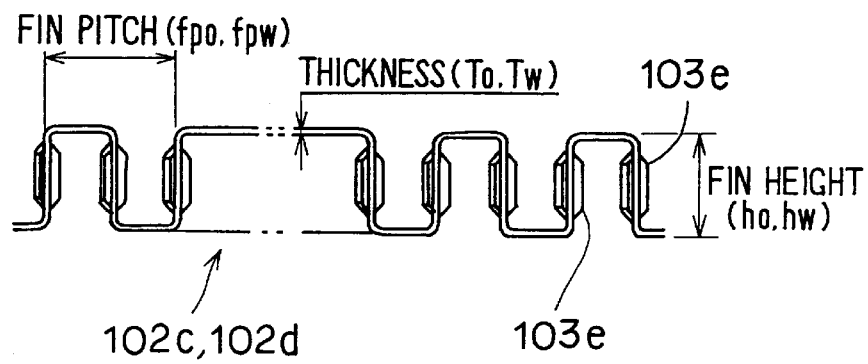
FIG. 3 is a cross-sectional view showing an inner fin of the core portion in the first embodiment.

Each of the inner fins 102*c*, 102*d* has as shown in FIG. 3 well-known louvers 103*e* which are formed by partially cutting and integrally bending up the inner fins 102*c*, 102*d* on the both surfaces thereof. The cooling water and the oil meander on the both surfaces of the respective inner fines 102*c*, 102*d* due to the louvers 103*e*. Incidentally, the core portion 102 is disposed in a filter bracket (casing) 105 composed of a bracket member 104 for being fixed to the engine and a partition member 103 brazed to the bracket member 104. The bracket member 104 and the partition member 103 are made of metal, specifically aluminum in this embodiment. The partition member 103 partitions inside the bracket member 104 into a core space 103*a* in which the core portion 102 is held and a filter casing portion (filter space) 103*b* in which the filter 101 is held.

The core space 103*a* accommodates the core portion 102 and constitutes part of the cooling water passage 103*c*. The core portion 102 is brazed to the inner wall of the filter bracket 105 (the partition member 103 and the bracket member 104). The filter bracket 105 has an inlet portion 102*e* for allowing the cooling water to flow into the core space 103*a* and an outlet portion 102*f* for allowing the cooling water, which has finished to exchange heat, to flow out from the core space 103*a*. Connection pipes 102*g* are connected to the inlet and outlet portions 102*e*, 102*f* by brazing for connecting external pipes (not shown).

When the core portion 102 and the filter bracket 105 are brazed, as shown in FIG. 1, each of the core plates 102*a*, 102*b*, the inner fines 102*c*, 102*d* respectively having front and back surfaces covered with brazing filler metal, and the partition member 103 are laminated with one another in a specific order in the filter bracket 105, and are brazed to one another in a state where an engine installation face 104*a* of the bracket member 104 is set on a lower side. The bracket member 104 is fixed to the engine through the engine installation face 104*a*. Accordingly, the core portion 102 can be securely brazed due to a gravitational force thereof.

Further, in the filter casing portion 103*b*, a check valve 106 made of rubber is provided to prevent the oil, which enters the filter casing portion 103*b* through the core portion 102, from flowing back toward the core portion side. The oil is filtered by the filter 101 and is returned toward the engine through a pipe portion 107 which extends from the central portion of the filter 101 and penetrates the central portion of the core portion 102. A seal member 108 made of rubber is disposed between the pipe portion 107 and the filter 101 to seal the gap between the pipe portion 107 and the filter 101.

The filter 101 is pushed against the partition member 103 by an elastic member 109 such as a disc spring, and the elastic member 109 is pushed by a lid 110 covering the opening of the filter casing portion 103*b*. The lid 110 is screwed to the bracket member 104 through an O-ring 111 to hermetically seal the filter casing portion 103*b*. The lid 110 has a bolt hole 104*b* for receiving a bolt (not shown) that fixes the filter bracket 105 (bracket member 104) to the engine. The bolt hole 104*b* is formed with width across flats to engage with a tool such as a spanner, which is used to rotate the lid 110. Incidentally, in the oil cooler 100 of this embodiment, the lid 110 is detached from the bracket member 104 when the filter 101 is exchanged.

Next, features and effects in this embodiment will be explained. First, the inner fins 102*c*, 102*d* are formed into rectangular corrugated shapes, respectively, by a roller forming method as a corrugated fin for a heat exchanger such as a radiator or a condenser can be. Because of this, the inner fins 102*c*, 102*d* can have a fin pitch (see FIG. 3) smaller than that of an offset type fin that is formed by pressing. As a result, a withstand pressure strength (mechanical strength) of the tube (oil passage) 103*d* becomes large as a multi-hole tube of a condenser, and the density of the inner fins is increased so that the oil cooler 100 is miniaturized.

Incidentally, a conventional automotive oil cooler has, as disclosed in JP-B2-2-10357, a cooling water passage, an oil passage (tube) defined within the cooling water passage by core plates, and offset type fins brazed to both surfaces (in both passages) of each of the core plates. The inventors of the present invention first studied the offset type fins and tried to decrease the fin pitch and the height of the offset type fins so that the fins have high densities. However, it was difficult to control the fin pitch and the height of the offset type fins, because the offset type fins were formed by pressing. As opposed to this, in this embodiment, the fin pitch and the height of the inner fins 102*c*, 102*d* can be readily controlled.

Meanwhile, the engine oil circulates within the engine to lubricate movement of pistons, com shafts, and the like and to cool such parts. The increase in density of the inner fins can decrease pressure loss of the oil cooler. As a result, the engine oil may not be supplied to all over the engine and accordingly the engine may seize. To solve this problem, in this embodiment, the thickness To of the oil side inner fin 102*c* is decreased to prevent pressure loss from increasing within the tube 103*d*, without lowering the withstand pressure strength of the tube 103*d*.

Secondly, because the thickness Tw of the water side inner fin 102*d* is set to be larger than the thickness To of the oil side inner fin 102*c*, a climbing rate of temperature of the water side inner fin 102d is prevented from exceeding that of the oil side inner fin 102c when they are brazed. Accordingly, the erosion of the water side inner fin 102d is prevented to prevent brazing deficiencies. As described above, according to the first embodiment, the oil cooler 100 can be miniaturized without deteriorating qualities such as the brazing properties and the withstand pressure strength.

In the oil cooler 100, a pressure of the oil flowing in the oil passage is higher than that of the cooling water flowing in the cooling water passage. Therefore, a pressure is liable to be applied from the oil to the cooling water passage to crush the cooling water passage especially when brazing deficiencies occur. However, in the present embodiment, because the thickness of the water side inner fin 102d is larger than that the oil side inner fin 102c, the water side inner fin 102d can sufficiently prevent the cooling water passage from being crushed by the pressure imparted from the oil. Further, the viscosity of the oil is larger than that of the cooling water. Therefore, setting the thickness of the oil side inner fin 102c to be thinner than that of the water side inner fin 102d decreases a flow resistance of the oil.

In addition, because the water side inner fin 102d always contacts the cooling water, the water side inner fin 102d is eroded more easily than the oil side inner fin 102c. Therefore, if the thicknesses of the inner fins 102c, 102d are equal to one another, the water side inner fin 102d is eroded more quickly than the oil side inner fin 102c. That is, the life-time of the oil cooler 100 is restricted by the life-time of the water side inner fin 102d. As opposed to this, according to this embodiment, because the thickness Tw of the water side inner fin 102d is thicker than the thickness To of the oil side inner fin 102c, the life-time of the water side inner fin 102d is lengthened, and consequently the life-time of the oil cooler 100 is lengthened.

Preferably, the thickness Tw of the water side inner fin 102d is more than 1.05 times as thick as the thickness To of the oil side inner fin 102c . More preferably, the thickness Tw of the water side inner fin 102d is more than 1.10 times as thick as the thickness To of the oil side inner fin 102c. Concerning the oil side inner fin 102c, referring again to FIG. 3, the fin height h0 of is preferably in a range of 1 mm to 3 mm, the thickness To is preferably in a range of 0.05 mm to 0.3 mm, and the fin pitch fp0 is preferably equal to or smaller than 4 mm. The plate thickness Tp of the tube 103 (core plate 102a or 102b) is preferably equal to or larger than 0.2 mm.

Figure 4:
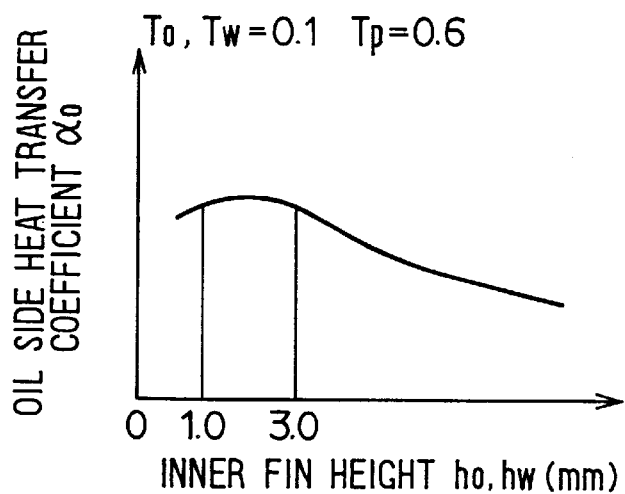
FIG. 4 is a graph showing a relationship between an oil side heat transfer coefficient and an inner fin height.
Figure 5:
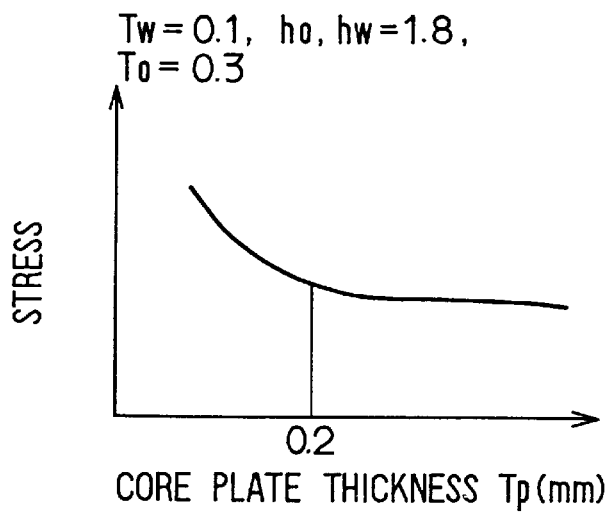
FIG. 5 is a graph showing a relationship between stress generated in the core plate and the thickness of the core plate.
Figure 6:
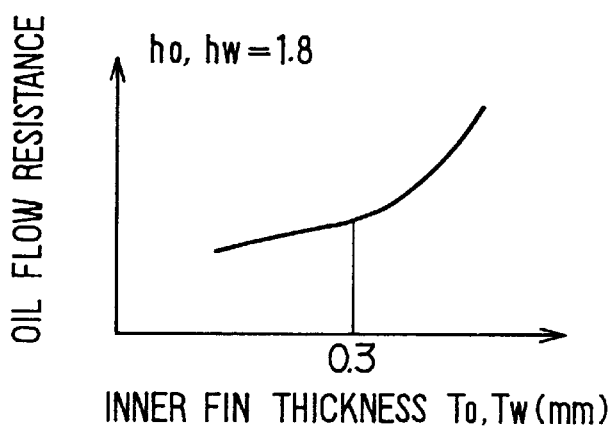
FIG. 6 is a graph showing a relationship between an oil flow resistance and the thickness of the inner fin.
Figure 7:
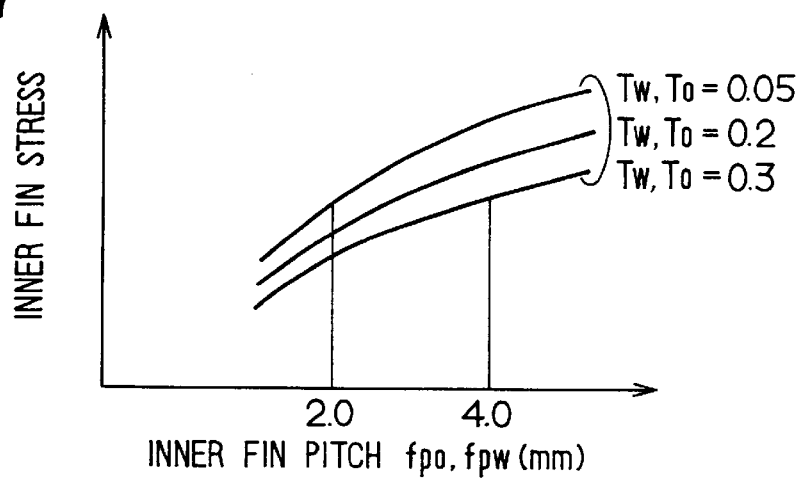
FIG. 7 is a graph showing relationships between stress generated in the inner fin and an inner fin pitch.
Figure 8:
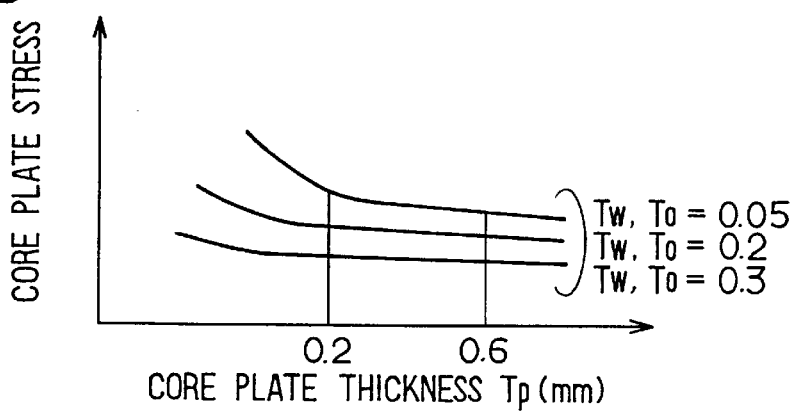
FIG. 8 is a graph showing relationships between stress generated in the core plate and the thickness of the core plate.
Figure 9:
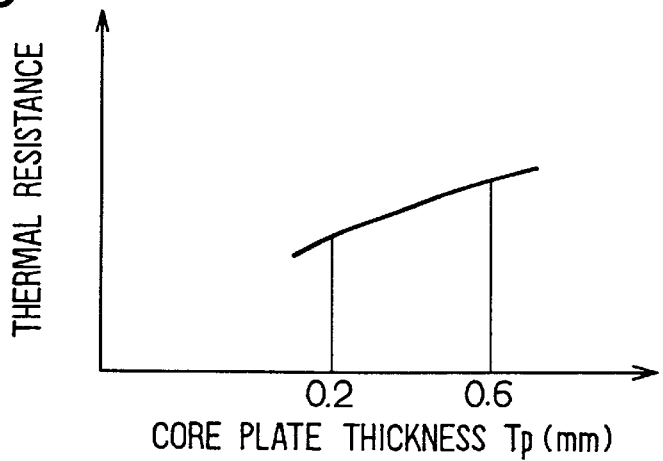
FIG. 9 is a graph showing a relationship between a thermal resistance and the thickness of the core plate.

Concerning the water side inner fin 102d, likewise, the fin height hw is preferably in a range of 1 mm to 3 mm, the plate thickness Tw is preferably in a range of 0.05 mm to 0.3 mm, and the fin pitch fpw is preferably equal to or smaller than 4 mm. These preferable dimensional ranges are determined by experimental results shown in FIGS. 4 through 9. For example, FIG. 4 shows a relationship between an oil side heat transfer coefficient $\alpha_o$ and the height h0 or ht of the inner fin 102c or 102d, when the thicknesses To, Tw of the inner fins 102c, 102d are 0.1 mm, respectively, and the thickness Tp of the tube 103d is 0.6 mm. This was examined to prevent the louvers 103e from being closed by the brazing filler metal. Incidentally, the lower limit (0.05 mm) of the thickness To, Tw of the inner fins 102c, 102d is determined so that the inner fins 102c, 102d can be securely brazed.

The core space 103a is filled with the cooling water, and the filter casing portion 103b is filled with the oil. Because the partition member 103 and the bracket member 104 are unified by brazing, it is not necessary that several O-rings are intervened between the core space 103a and the filer casing portion 103d to secure the sealing property therebetween as for example described in European Patent No. 631804A1 (Jan. 4, 1995). This results in decrease in number of the parts of the oil cooler 100, and therefore results in manufacturing cost reduction and size reduction of the oil cooler 100. The mountability of the oil cooler 100 to the vehicle is improved due to the size reduction. In addition, the number of the O-rings that are consumable supplies is decreased, so that a burden to a user of the vehicle is reduced after the user has purchased the vehicle (engine).

(Second Embodiment)

Figure 10:
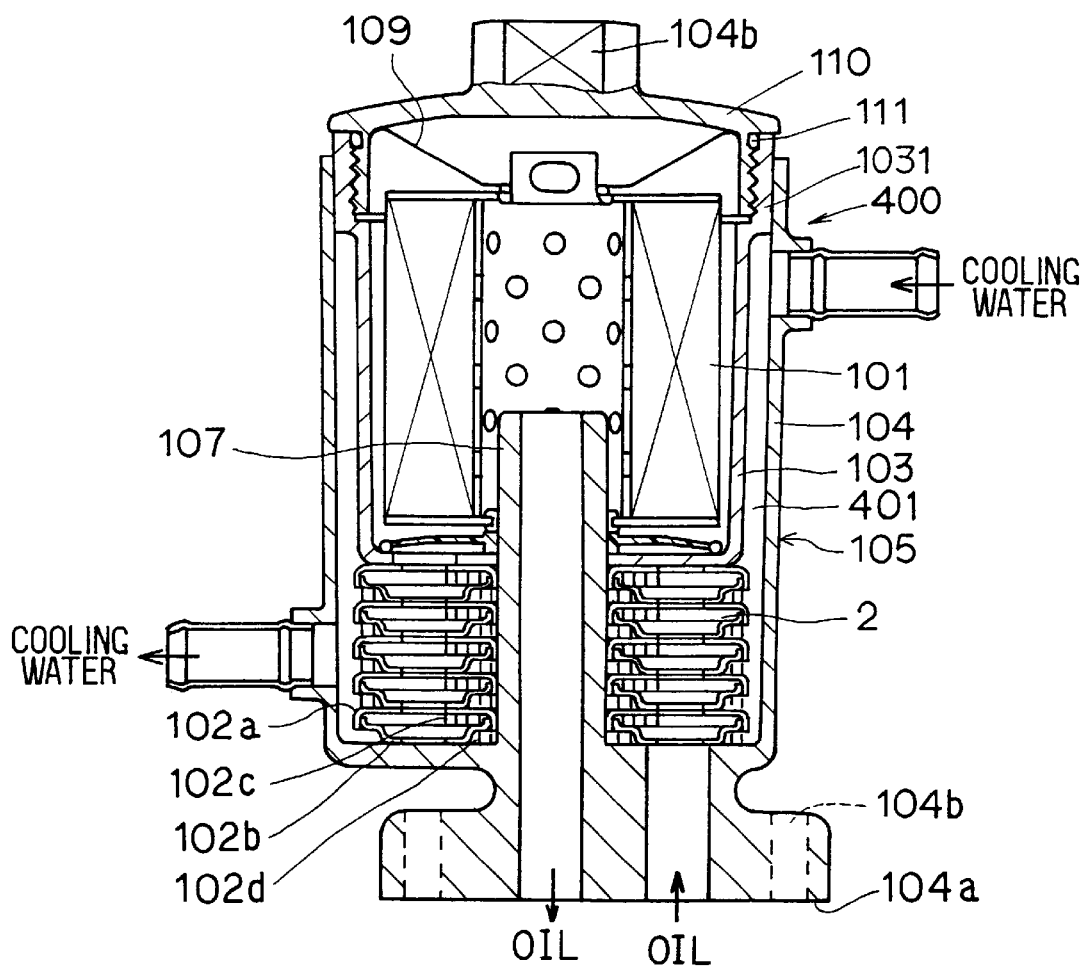
FIG. 10 is a cross-sectional view showing an oil cooler in a second embodiment.

Referring to FIG. 10, an oil cooler 400 in a second preferred embodiment has around the filter 101 a cooling water passage 401 in which the cooling water flows. The cooling water passage 401 is provided between a partition member 1031 and the bracket member 104. Accordingly, an amount of heat exchange between the cooling water and the oil is increased, so that the temperature of the oil can be more decreased. This lengthens the life-time of the oil. Accordingly, the frequency for exchanging the oil is decreased so that the burden of the user is reduced. The other features and effects are the same as those in the first embodiment, and the same explanations are not reiterated.

In the embodiments described above, both of the inner fins 102c, 102d are formed into a rectangular corrugated shape, respectively. However, the shape of the fins are not limited to that and may be a sinwave like shape. Although the oil cooler 100 or 400 is an exterior type oil cooler having the core portion 102 disposed outside of the engine, the present invention can be applied to an interior type oil cooler having a core portion disposed in an engine water jacket (cooling water passage) within the engine.

(Third Embodiment)

Figure 11:
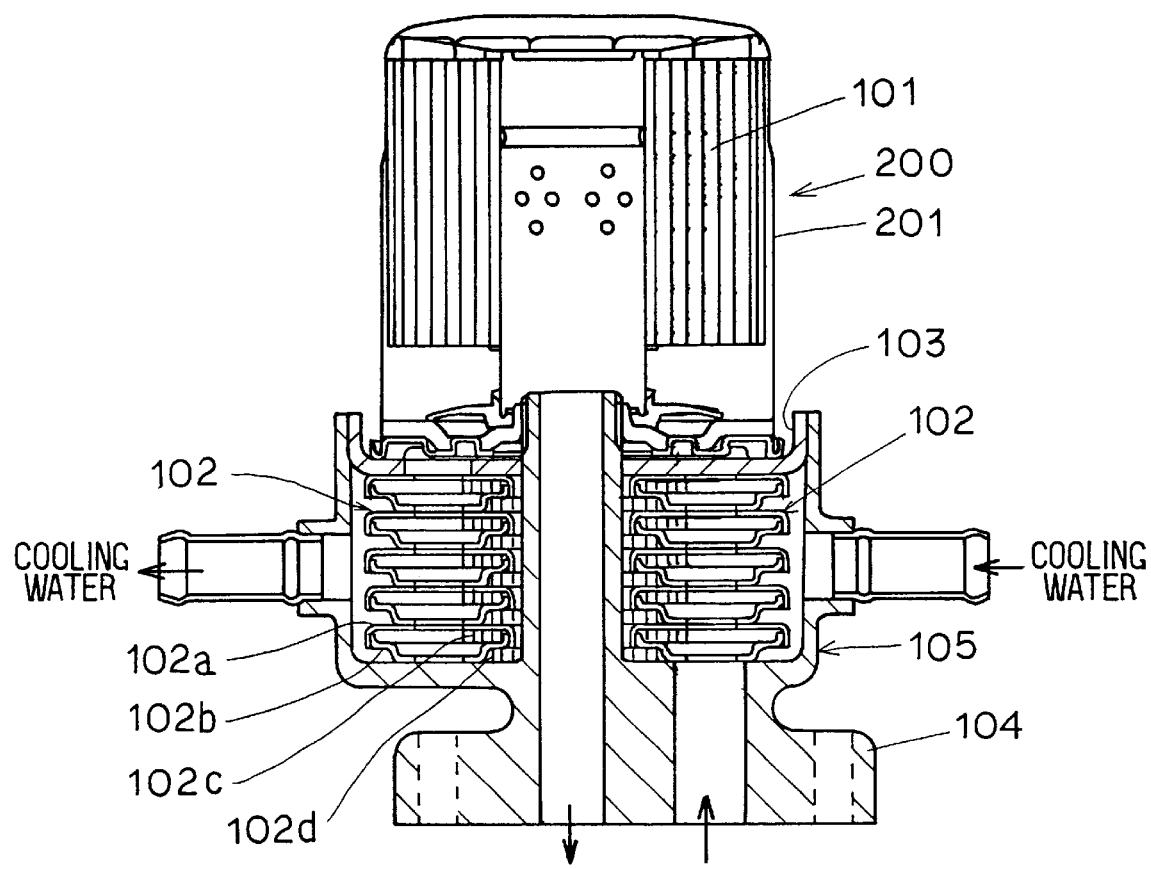
FIG. 11 is a cross-sectional view showing an oil cooler in a third embodiment.

In the first embodiment, the bracket member 104 of the filter bracket 105 has the filter casing portion 103b. As opposed to this, in an oil cooler 200 of a third preferred embodiment, as shown in FIG. 11, a filter casing 201 for accommodating the filter 101 therein is integrated with the filter 101. When the filter 101 is exchanged, the filter casing 102 is also exchanged together with the filter 101. In the third embodiment, the partition member 103 separates the core space 103a from the portion where the filter 101 and the filter casing 201 are disposed, and simultaneously serves as a fixing member for fixing the filter 101 and the filter casing 201. The other features and effects are the same as those in the first embodiment.

(Fourth Embodiment)

Figure 12:
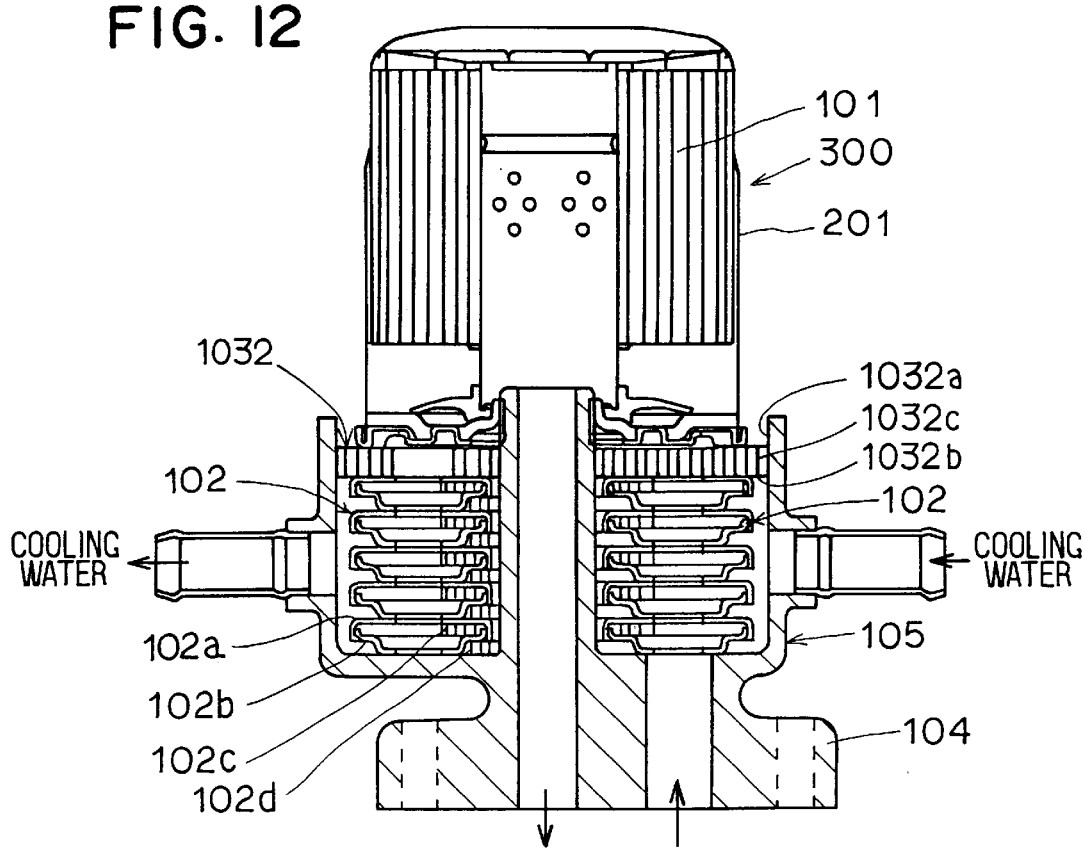
FIG. 12 is a cross-sectional view showing an oil cooler in a fourth embodiment.

In the third embodiment, the partition member 103 is composed of an aluminum plate. As opposed to this, referring to FIG. 12, an oil cooler 300 of a fourth preferred embodiment has a partition member 1032, which is a honeycomb structural member (see FIG. 13) composed of an aluminum thin plate 1032c perpendicularly joined to two aluminum thin plates 1032a, 1032b therebetween. Accordingly, the partition member 1032 is lightened, resulting in lightening of the oil cooler 300. In addition, the rigidity of the partition member 1032 is improved. The other features and effects are the same as those in the third embodiment.

(Fifth Embodiment)

Figure 14:
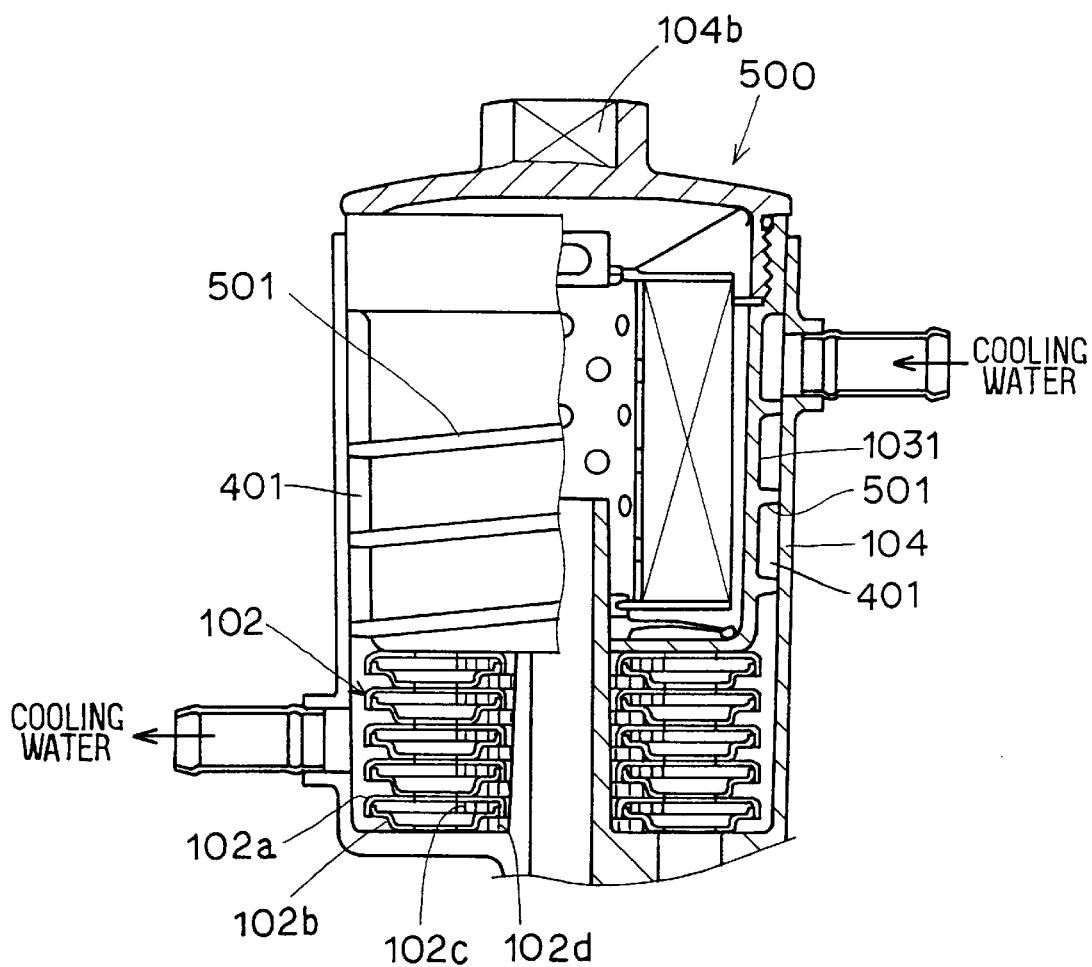
FIG. 14 is a cross-sectional view showing an oil cooler in a fifth embodiment.

An oil cooler 500 in a fifth preferred embodiment is a modified one of the oil cooler 400 in the second embodiment. Referring to FIG. 14, the oil cooler 500 has a spiral first fin (first protruding member) 501 in the cooling water passage 401. The spiral fin 501 protrudes from the partition member 1031 toward the bracket member 104 in the cooling water passage 401. Accordingly, the heat exchange between the cooling water and the oil is facilitated in the cooling water passage 401, so that the temperature of the oil is further lowered. The other features and effects are the same as those in the second embodiment.

(Sixth Embodiment)

Figure 15:
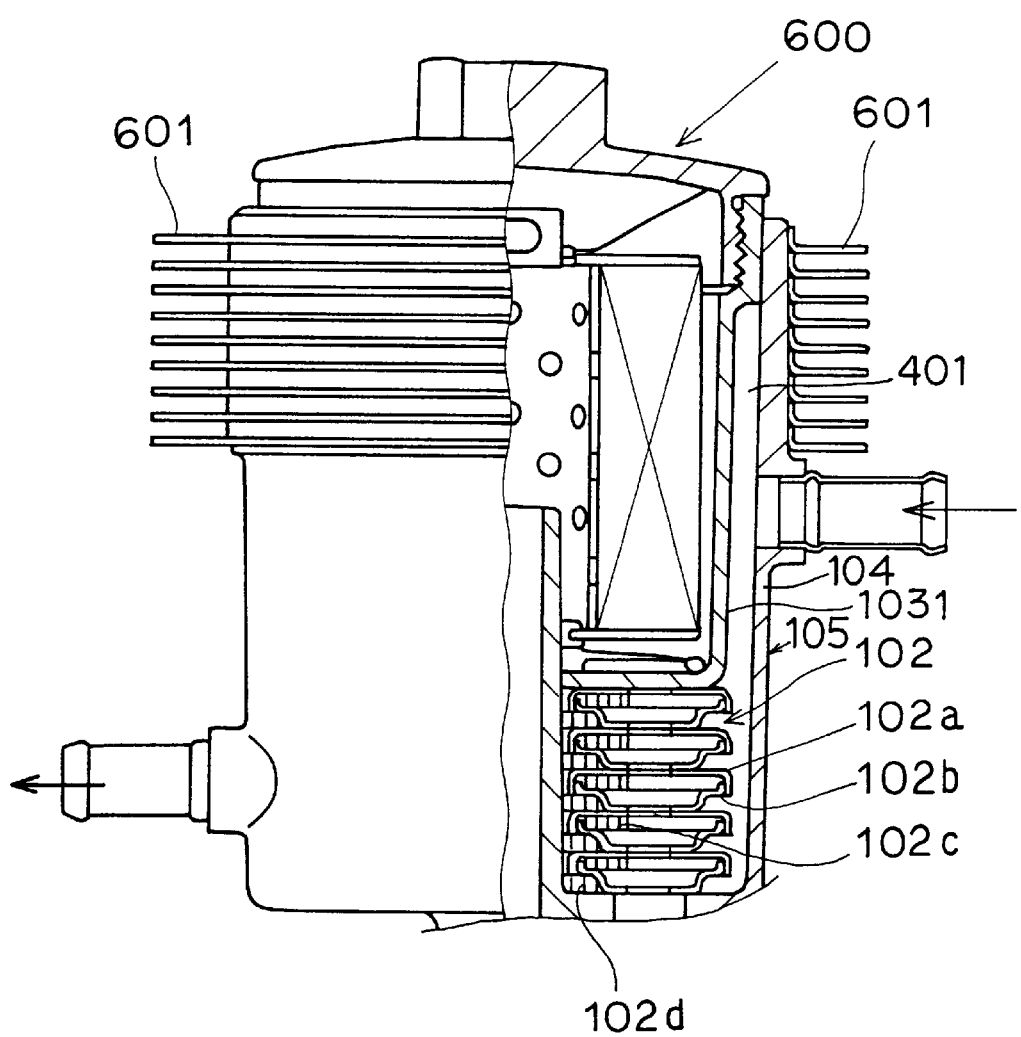
FIG. 15 is a cross-sectional view showing an oil cooler in a sixth embodiment.

An oil cooler 600 in a sixth preferred embodiment is another modified one of the oil cooler 400 in the second embodiment. Referring to FIG. 15, the oil cooler 600 has a second fin (second protruding member) 601 protruding from the outside wall of the bracket member 104 of the filter bracket 105. This embodiment is explained based on the oil cooler 400 in the second embodiment; however, it may be applied not only to the oil cooler 400 but also to the oil cooler 500 in the fifth embodiment, or the oil cooler in which the cooing water passage 401 is not provided as in the first to third embodiments.

(Seventh Embodiment)

The oil coolers 100–600 in the first to sixth embodiments are exterior type oil coolers respectively including the core portion 102 which is positioned outside of the engine. As opposed to this, in a seventh preferred embodiment, the present invention is applied to an interior type oil cooler 700 including the core portion 102 positioned within the engine, specifically within a water jacket (cooling water passage) of the engine.

Figure 17A:
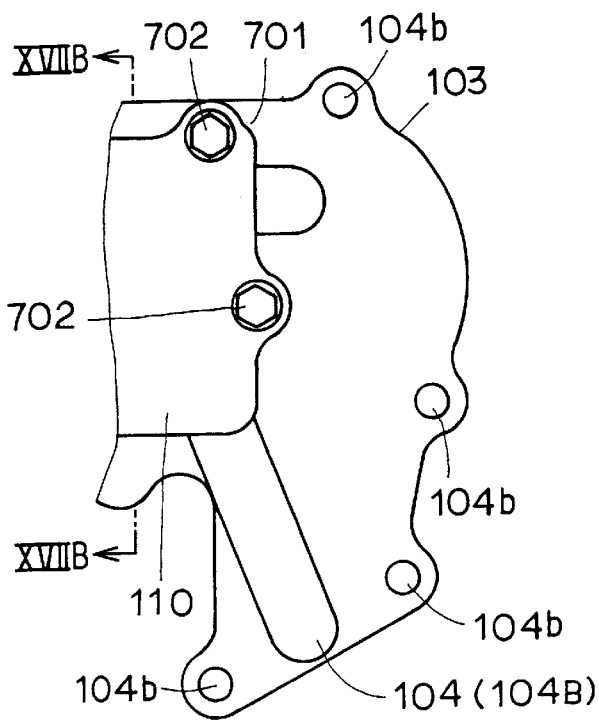
FIG. 17A is a front view partially showing the oil cooler in the seventh embodiment.
Figure 17B:
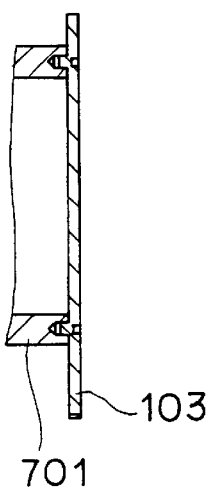
FIG. 17B is a cross-sectional view taken along a XVIIB—XVIIB line in FIG. 17A.

Referring to FIGS. 16A–16C, also in the oil cooler 700, the partition member 103 (plate member) and the bracket member 104 including bracket parts 104A–104D are integrally brazed to one another. The filter 101 is accommodated within a filter chamber 701 made of aluminum. The filter chamber 701 is brazed to the partition member 103 and the bracket member 104 after it is formed into a specific shape by pressing or by forging (see FIGS. 17A, 17B). In the oil cooler 700, the lid 110 is fixed to the filter chamber 701 by bolts 702.

Figure 18:
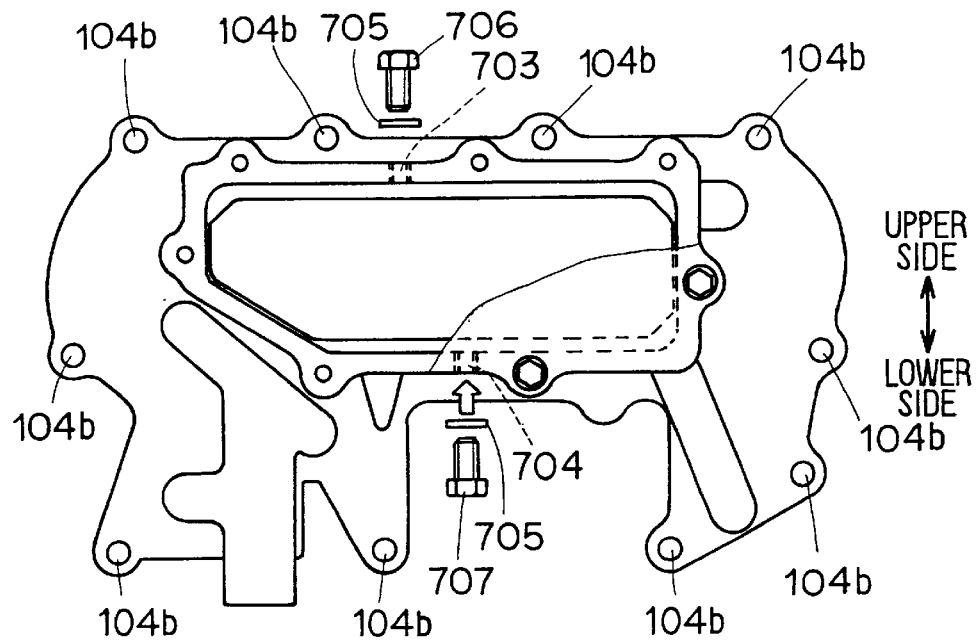
FIG. 18 is a front view showing the oil cooler in the seventh embodiment.

As shown in FIG. 18, internal threaded holes 703, 704 are formed on upper and lower sides of the filter chamber 701, respectively, and bolts 706, 707 are inserted into the holes 703, 704 through flat washers 705 made of relatively soft metal such as copper. Therefore, when the filter 101 is exchanged, the oil pooling in the filter chamber 701 readily flows out by disengaging the bolts 706, 707. As a result, exchanging performance of the filter 101 can be improved.

Figure 19:
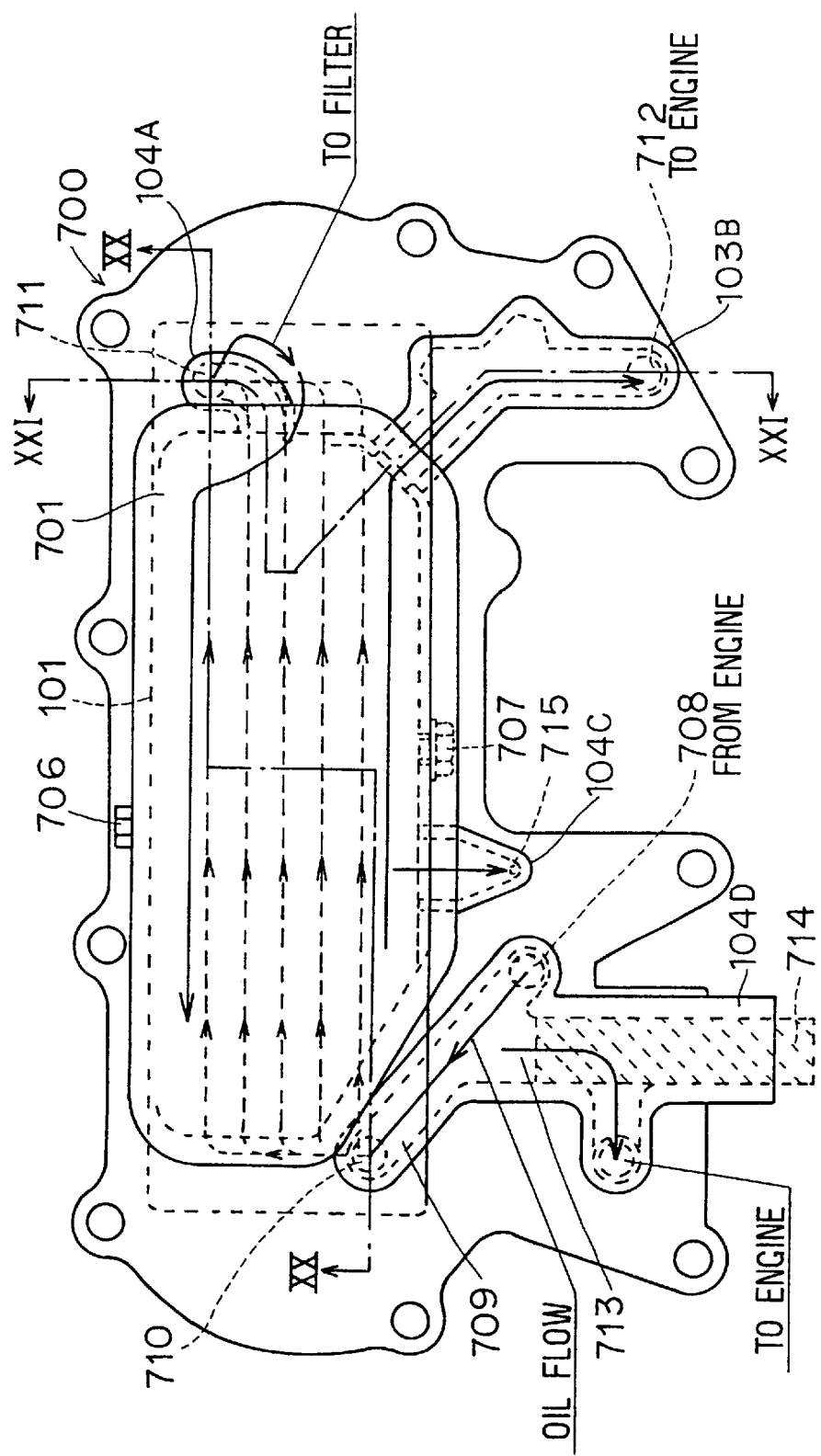
FIG. 19 is an explanatory view showing an oil flow route in the oil cooler in the seventh embodiment.
Figure 20:
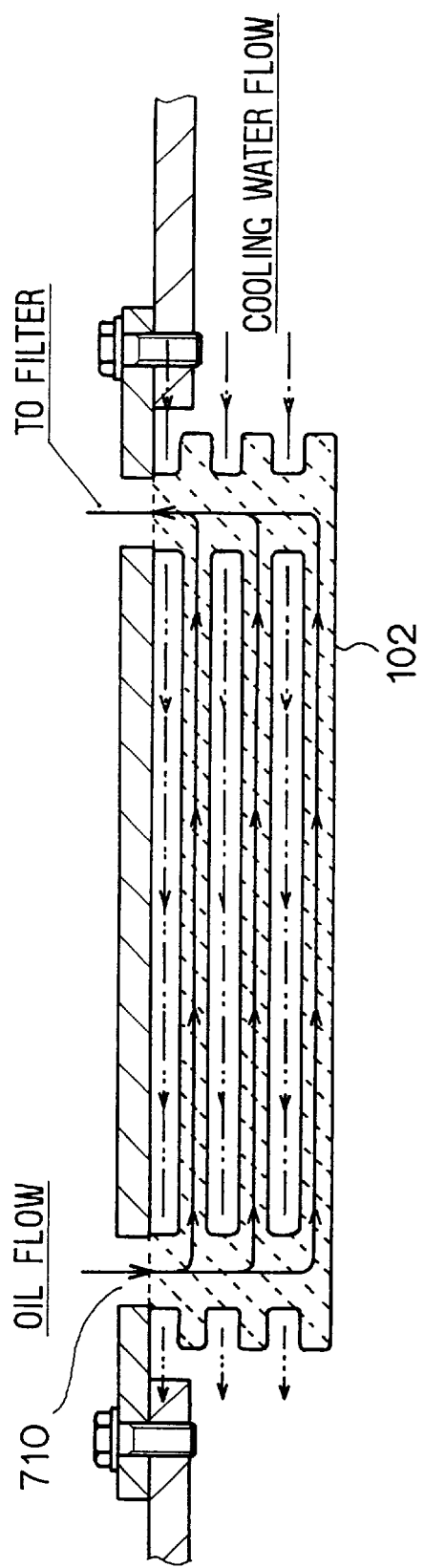
FIG. 20 is a cross-sectional view taken along a XX—XX line in FIG. 19.
Figure 21:
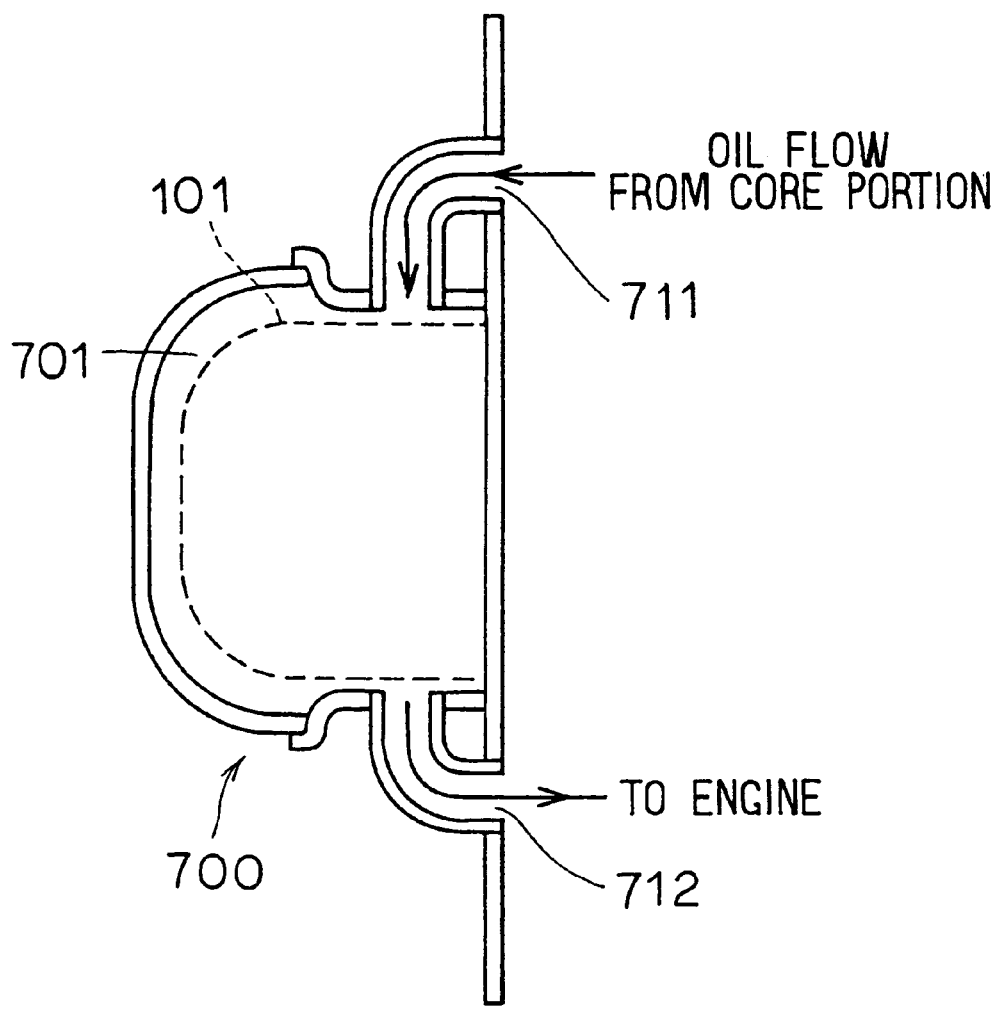
FIG. 21 is a cross-sectional view taken along a XXI—XXI line in FIG. 19.

Next, the flow route of the oil in the oil cooler 700 will be generally explained. As shown in FIG. 19, the oil discharged from the engine enters the inside of the oil cooler 700 from an engine side oil inlet 708 provided in the bracket part 104D of the bracket member 104, passes through an oil passage 709 provided in the bracket part 104D, and flows into the core portion 102 through a core side oil outlet 710 (see FIG. 20). Then, as shown in FIGS. 19, 21, the oil which has finished heat exchange in the core portion 102 flows into the filter chamber 701 through a core side oil inlet 711 formed in the bracket part 104A, is filtered by the filter 101, and returnee to the engine through a first engine side oil outlet 712 formed in the bracket part 104B. The bracket part 104D defines a reflux passage 713 for diverging the oil from the oil passage 709 to circulate it to the engine. A relief valve 714 is disposed in the reflux passage 713 for directly returning the oil, which is conducted through the engine side oil inlet 708, to bypass the oil cooler 700 when the pressure inside of the oil cooler 700 (the core portion 102 and the filter chamber 701) exceeds a specific magnitude. Incidentally, numeral 715 represents a hole for circulating part of the oil within the filter chamber 701 to an oil pan.

(Eighth Embodiment)

Figure 22B:
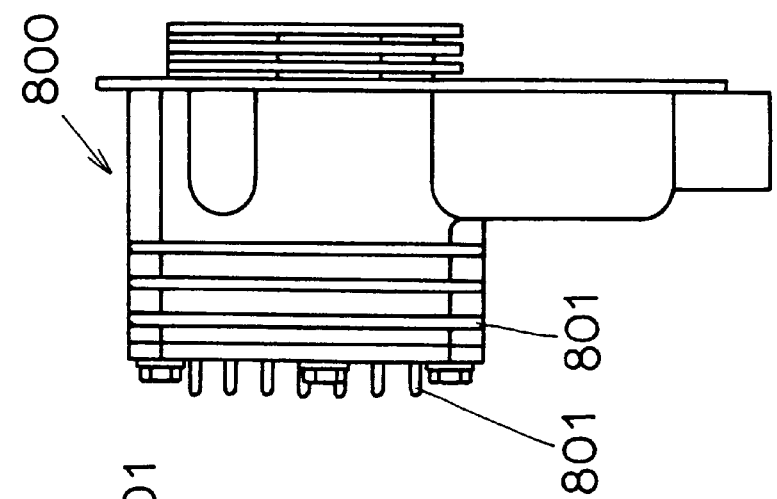
FIG. 22B is a right side view of the oil cooler of FIG. 22A.
Figure 22A:
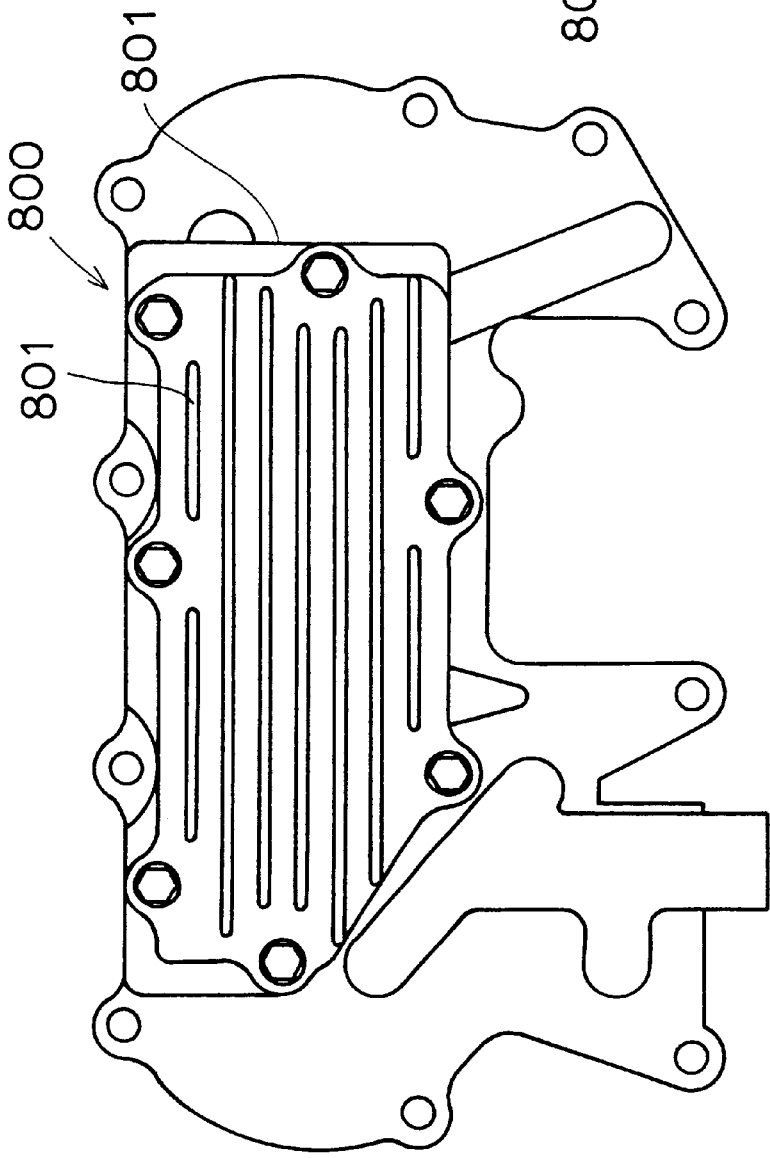
FIG. 22A is a front view showing an oil cooler in an eighth embodiment.

Referring to FIGS. 22A, 22B, an oil cooler 800 in an eighth preferred embodiment is a modified one of the oil cooler 700 in the seventh embodiment. Specifically, the oil cooler 800 has a fin (third protruding member) 801 protruding from the outside wall of the filter chamber 701 and the lid 110. Accordingly, the temperature of the oil can be lowered as in the fifth and sixth embodiments, and thereby the life-time of the oil is lengthened.

(Ninth Embodiment)

Figure 13:
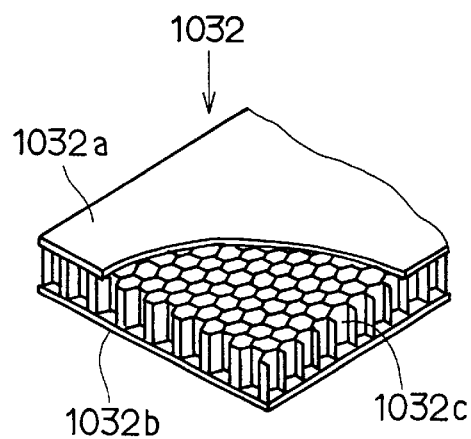
FIG. 13 is a perspective view showing a honeycomb structural member employed as a partition member in the fourth embodiment.
Figure 23A:
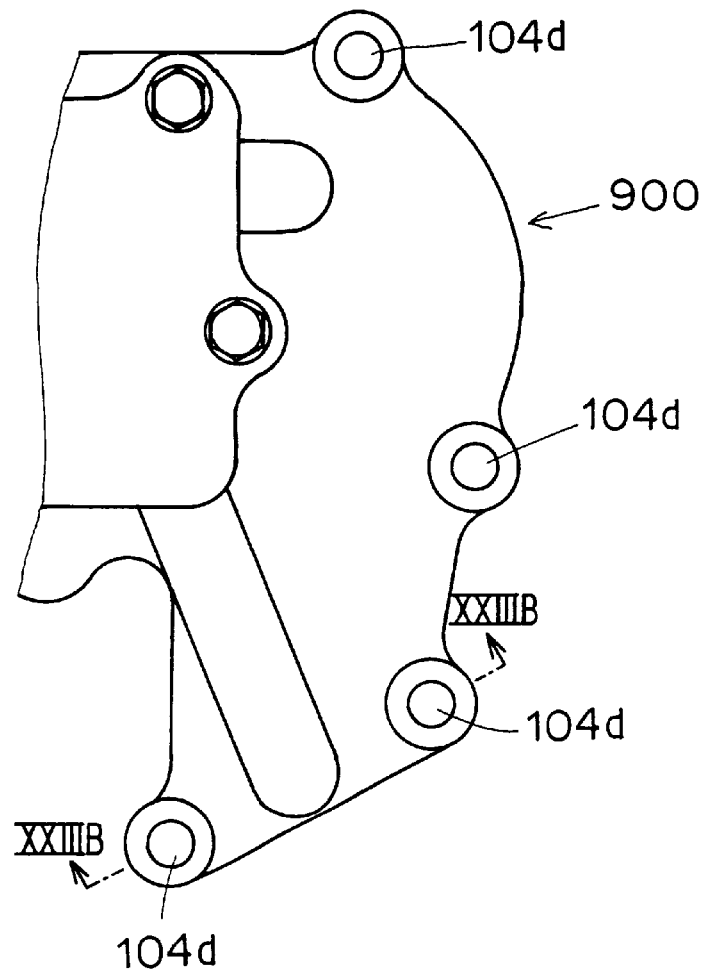
FIG. 23A is a front view partially showing an oil cooler in a ninth embodiment.
Figure 23B:
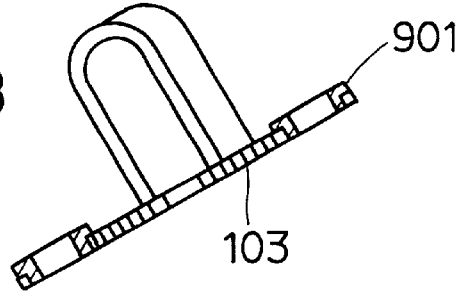
FIG. 23B is a cross-sectional view taken along a XXIIIB—XXIIIB in FIG. 23A.

An oil cooler 900 in a ninth preferred embodiment is an interior type oil cooler as those in the seventh and eighth embodiments, and adopts a honeycomb structural member as shown in FIG. 13 as the partition member 1032. The partition member 1032 has bolt holes 104d into which bolts are inserted. In this case, as shown in FIGS. 23A, 23B, it is preferable that reinforcement collars 901 are brazed to the honeycomb partition member 1032 around the bolts holes 104d.

(The Other Embodiments)

In the fourth and ninth embodiments, the partition member 1032 is composed of a honeycomb structural member; however, the present invention is not limited to it. The entire filter bracket 105, the bracket member 104, or the filter chamber 701 may be composed of a honeycomb structural member.

In the first to sixth embodiments, although the core portion 102 is brazed to both of the partition member 103 and the bracket member 104, the core portion 102 may brazed to only one of the partition member 103 and the bracket member 104. In the second embodiment, although the cooling water passage 401 is defined by the partition member 1031 and the bracket member 104, the cooling water passage 401 can be defined by the other members.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An oil cooler for cooling oil, comprising:
   a casing defining therein a cooling water passage in which cooling water flows;
   a tube disposed in the cooling water passage and defining therein an oil passage in which oil flows;
   an oil side fin fixed to an inside wall of the tube;
   a water side fin fixed to an outside wall of the tube and having a plate thickness thicker than that of the oil side fin;
   a partition member partitioning inside of the casing into the cooling water passage and a filter casing portion and forming part of the oil passage for introducing the oil from the tube into the filter casing portion, the partition member being made of metal and integrally brazed to the casing; and
   a filter disposed in the filter casing portion of the casing for filtering the oil, the filter being surrounded by the cooling water passage;
   wherein the oil flowing in the oil passage has a pressure higher than that of the cooling water flowing in the cooling water passage.

2. The oil cooler of claim 1, wherein the oil side fin and the water side fin are corrugated fins.

3. The oil cooler of claim 1, wherein the plate thickness of the water side fin is more than 1.05 times as thick as that of the oil side fin.

4. The oil cooler of claim 3, wherein the plate thickness of the water side fin is more than 1.1 times as thick as that of the oil side fin.

5. The oil cooler of claim 1, wherein:
the oil side fin has a plurality of louvers for meandering the oil on both surfaces thereof;
a height of the oil side fin is in a range of 1 mm to 3 mm;
a plate thickness of the oil side fin is in a range of 0.05 mm to 0.3 mm;
a fin pitch of the oil side fin is less than 4 mm; and
a plate thickness of the tube is more than 0.2 mm.

6. The oil cooler of claim 5, wherein:
a height of the water side fin is in a range of 1 mm to 3 mm;
the plate thickness of the water side fin is in a range of 0.05 mm to 0.3 mm; and
a fin pitch of the water side fin is less than 4 mm.

7. The oil cooler of claim 1, wherein the cooling water passage is defined between the casing and the partition member.

8. The oil cooler of claim 1, further comprising a protruding member protruding from the casing.

9. The oil cooler of claim 1, wherein the partition member has a honeycomb structure.

10. An oil cooler for cooling oil, comprising:
a casing defining therein a cooling water passage in which cooling water flows;
a tube disposed in the cooling water passage and defining therein an oil passage in which oil flows;
an oil side fin fixed to an inside wall of the tube;
a water side fin fixed to an outside wall of the tube and having a plate thickness thicker than that of the oil side fin;
a partition member partitioning inside of the casing into the cooling water passage and a filter casing portion and forming part of the oil passage for introducing the oil from the tube into the filter casing portion, the partition member being made of metal and integrally brazed to the casing; and
a filter disposed in the filter casing portion of the casing for filtering the oil,
wherein the oil flowing in the oil passage has a pressure higher than that of the cooling water flowing in the cooling water passage; and
a first protruding member disposed in the cooling water passage surrounding the filter and protruding from a wall of the partition member toward an inside wall of the casing.

11. The oil cooler of claim 10, further comprising a second protruding member protruding from the casing.

12. An oil cooler for cooling oil, comprising:
a casing defining therein a cooling water passage in which cooling water flows;
a tube disposed in the cooling water passage and defining therein an oil passage in which oil flows;
an oil side fin fixed to an inside wall of the tube;
a water side fin fixed to an outside wall of the tube and having a plate thickness thicker than that of the oil side fin;
a partition member partitioning inside of the casing into the cooling water passage and a filter casing portion and forming part of the oil passage for introducing the oil from the tube into the filter casing portion, the partition member being made of metal and integrally brazed to the casing; and
a filter disposed in the filter casing portion of the casing for filtering the oil,
wherein the oil flowing in the oil passage has a pressure higher than that of the cooling water flowing in the cooling water passage; and
the partition member has a honeycomb structure.

13. An oil cooler for cooling oil, comprising:
a core portion having a tube for cooling oil flowing therein by transferring heat from the oil to cooling water flowing outside the tube, an oil side fin fixed to an inside wall of the tube, and a water side fin fixed to an outside wall of the tube and having a plate thickness thicker than that of the oil side fin;
a filter for filtering the oil that is cooled in the core portion;
a partition member disposed between the core portion and the filter and separating a core space in which the core portion is disposed from a filter space in which the filter is disposed; and
a filter chamber for accommodating the filter therein, the filter chamber having a protruding member protruding from an outside wall thereof;
wherein the oil flowing inside the tube has a pressure higher than that of the cooling water flowing outside the tube; and
the core portion is disposed in a cooling water passage of a water-cooled engine.

14. The oil cooler of claim 13, wherein the oil side fin and the water side fin are corrugated fins.

15. The oil cooler of claim 13, further comprising a casing for accommodating the core portion and the filter therein,
wherein the partition member is brazed to an inside wall of the casing and partitions inside of the casing into the core space and the filter space.

16. A cooler comprising:
a member separating a first fluid passage, in which first fluid flows to be cooled, from a second fluid passage in which second fluid flows to cool the first fluid;
a cooled side fin disposed in the first fluid passage and fixed to the member for transferring heat from the first fluid to the second fluid through the member;
a cooling side fin disposed in the second fluid passage and fixed to the member at an opposite side of the cooled side fin, for receiving the heat from the first fluid through the cooled side fin and the member and for transferring the heat to the second fluid; and
a filter communicating with the first fluid passage for filtering the first fluid;
wherein a plate thickness of the cooled side fin is thinner than that of the cooling side fin; and
the second fluid passage surrounds the filter to form a specific space therebetween, the specific space forming a part of the first fluid passage.

17. The cooler of claim 16, wherein the first fluid flowing in the first fluid passage has a pressure higher than an pressure of the second fluid flowing in the second fluid passage.

18. An oil cooler for cooling oil, comprising:

a casing;

a partition member partitioning an inside of the casing into a cooling fluid passage in which cooling fluid flows and a filter casing portion;

a passage member disposed in the cooling fluid passage to communicate with the filter casing portion and defining therein an oil passage in which oil flows to be cooled by the cooling fluid and to enter the filter casing portion;

a filter disposed in the filter casing portion to receive the oil from the tube for filtering the oil, wherein the filter is surrounded by the cooling fluid passage.

19. The oil cooler of claim 18, further comprising:

an oil side fin disposed in the passage member; and a cooling fluid side fin disposed outside the passage member and inside the cooling fluid passage, the cooling fluid side fin having a plate thickness thicker than that of the oil side fin.

20. The oil cooler of claim 19, wherein a pressure of the oil flowing in the oil passage is higher than that of the cooling fluid flowing in the cooling fluid passage.

* * * * *